(12) United States Patent
Miyake et al.

(10) Patent No.: US 6,646,535 B2
(45) Date of Patent: Nov. 11, 2003

(54) MAGNETIC CORE (75) Inventors: Nobuaki Miyake, Tokyo (JP); Yuji Nakahara, Tokyo (JP); Hiroyuki Akita, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/096,273

(22) Filed: Mar. 13, 2002

(65) Prior Publication Data
US 2002/0130750 A1 Sep. 19, 2002

(30) Foreign Application Priority Data
Mar. 15, 2001 (JP) ......................................... 2001-073214

(51) Int. Cl.[7] ............................................... H01F 27/24
(52) U.S. Cl. .................. 336/212; 336/210; 336/234; 336/217; 310/217
(58) Field of Search ................................. 336/212, 233, 336/234, 210, 211, 216, 217; 310/216–218

(56) References Cited

U.S. PATENT DOCUMENTS

| | | | |
|---|---|---|---|
| 4,048,605 A | * | 9/1977 | McCollum ................... 336/217 |
| 5,583,387 A | * | 12/1996 | Takeuchi et al. ............ 310/217 |
| 5,729,072 A | * | 3/1998 | Hirano et al. ................ 310/217 |
| 5,859,486 A | * | 1/1999 | Nakahara et al. ........... 310/216 |
| 5,986,377 A | * | 11/1999 | Yamada et al. ............. 310/216 |
| 6,369,687 B1 | | 4/2002 | Akita et al. |

FOREIGN PATENT DOCUMENTS

JP     2000-201457     7/2000

* cited by examiner

*Primary Examiner*—Tuyen T. Nguyen
(74) *Attorney, Agent, or Firm*—Burns, Doane, Swecker & Mathis, LLP (57) ABSTRACT

A core has a plurality of plate-shape core pieces with a magnetic pole tooth and having connecting portions formed at one end and having a first circular arc end surface and having at the other end a second end surface which can mate with the first end surface of an adjoining core piece. The core pieces are arranged in the shape of a strip through the end surfaces to form a first core member and a second core member. The core members are stacked so that the ends of adjoining core pieces in the stacking direction overlap and such that adjoining connecting portions can freely rotate through connecting means to form a ring with the magnetic pole teeth on the inside. A cutout is formed in the corner of the outer side of the core in the second end surface of each core piece.

3 Claims, 8 Drawing Sheets

MAGNETIC CORE

BACKGROUND OF THE INVENTION

This invention relates to a core in which a strip-shaped core members having a plurality of core pieces connected to each other by connecting portions are stacked so that adjoining edges in the stacking direction of the core pieces overlap each other, and which is formed into a ring by rotation of the connecting portions. In particular, it relates to the shape of the end surfaces of the core pieces.

This type of conventional core is constructed as disclosed in Japanese Published Unexamined Patent Application No. 2000-201458, for example, and as described below.

Figure 9:
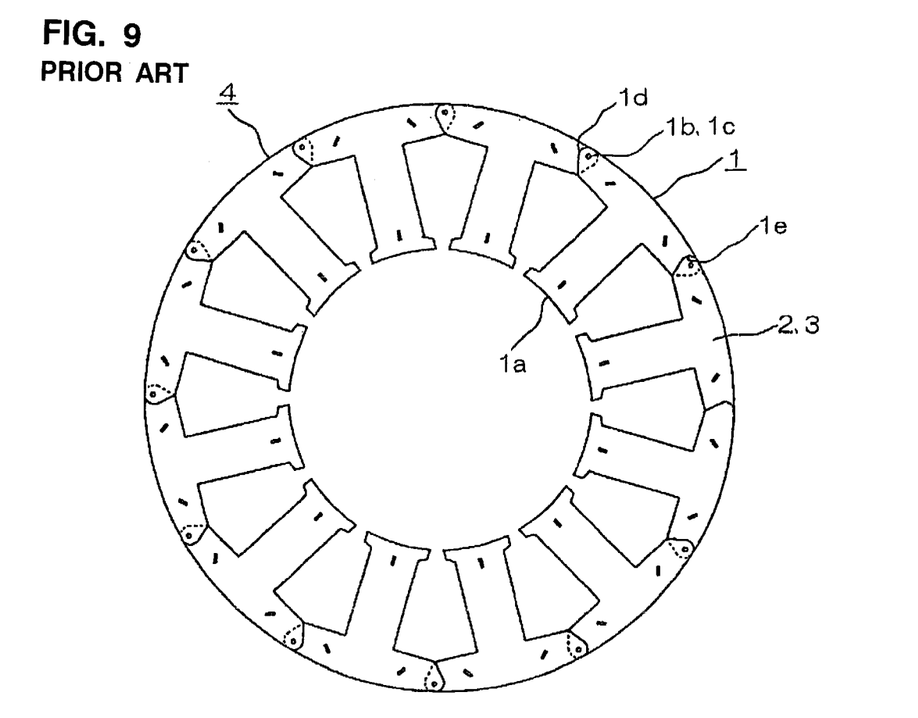
FIG. 9 is a plan view showing the structure of a conventional core.
Figure 10:
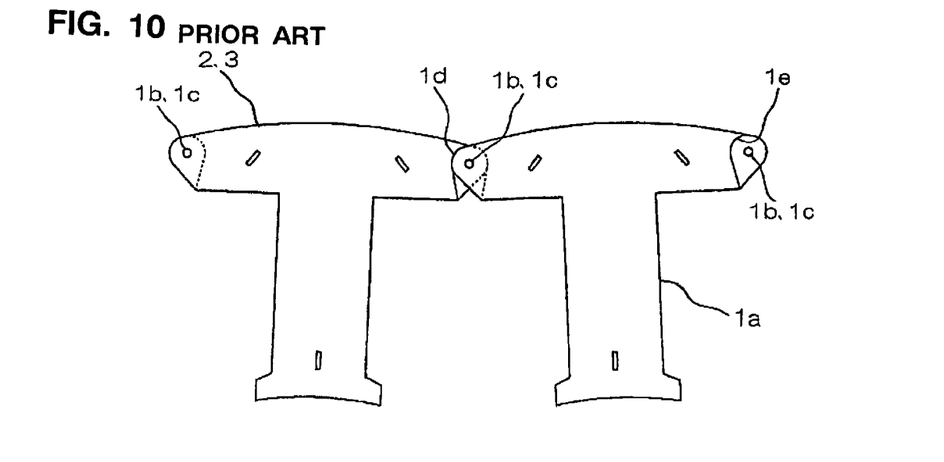
FIG. 10 is a plan view showing a portion of the core of FIG. 9 deformed into a straight line.
Figure 11:
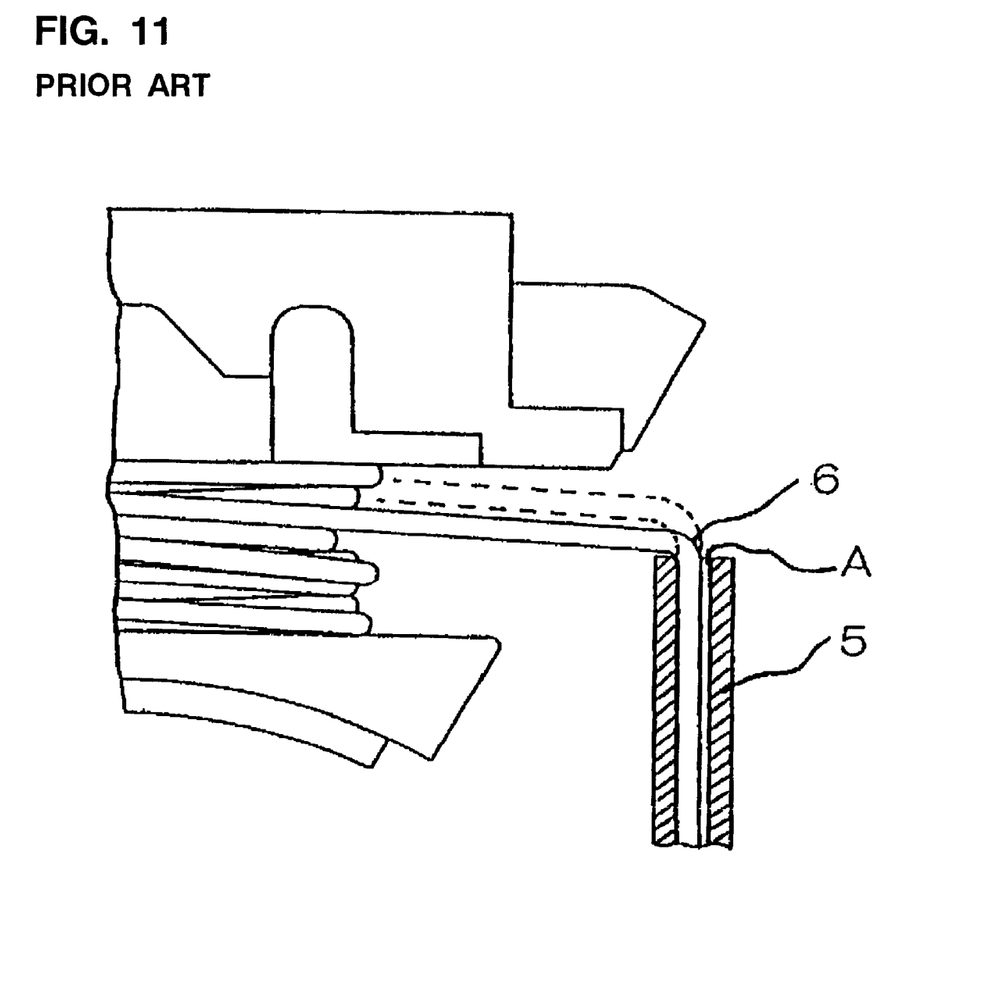
FIG. 11 is a detailed view for explaining a problem at the time of winding a conventional core.

FIG. 9 is a plan view showing the structure of a conventional core, FIG. 10 is a plan view showing a portion of the core of FIG. 9 deformed into a linear shape, and FIG. 11 is a detailed view for explaining a problem when installing the windings of a conventional core.

In the figures, 1 is a plate-shaped core piece of a magnetic material. A magnetic pole tooth 1a projects from one side, and a recess 1b and a projection 1c are formed on the rear and front surfaces of one end as a connecting means. A first end surface 1d is formed into the shape of a circular arc centered on the center of the recess and the projection 1b and 1c. At the other end is formed a second end surface 1e which can mate with the first end surface 1d of and adjoining core piece 1. 2 is a first core member in which a plurality of core pieces 1 are arranged through the end surfaces 1d and 1e.

3 is a second core member in which each core piece 1 is arranged oppositely in the lengthwise direction from the first core member 2. It is alternatingly stacked with the first core member 2, and the recesses and projections 1b and 1c of adjoining core pieces 1 in the stacking direction mate with each other whereby they are connected so as to be able to freely rotate. 4 is a core which is formed in the shape of a ring by rotating the recesses and projections 1b and 1c of each core piece 1 of both core members 2 and 3 which are stacked atop each other. The end portions of opposing core pieces 1 overlap each other through the recesses and projections 1b and 1c.

A conventional core is constituted as described above. As shown in FIG. 10, it is intended to simplify winding operation by deforming both core members 2 and 3 into a straight line and then carrying out winding (not shown) on the magnetic pole tooth 1a. However, even if both core members 2 and 3 are put into a straight line, it is difficult to obtain sufficient space for winding, and rewinding can be performed only with a nozzle.

When rewinding is carried out with a nozzle, as shown in FIG. 11, the bending radius of the inner diameter corner portion (shown by A in the figure) of the discharge opening of the nozzle 5 is small, and depending upon the position of movement of the nozzle, when a magnetic wire 6 is in the positions shown by the solid lines and the dashed lines in the figure, the frictional resistance between the magnet wire 6 and the corner portion varies, and the tension applied to the magnet wire 6 varies, so it is difficult to maintain alignment during rewinding. In addition, when the magnet wire 6 has a large diameter, there are problems such as that strains develop.

SUMMARY OF THE INVENTION

This invention was made in order to solve such problems. Its object is to provide a core with which it is possible to perform rewinding operation using a flyer and which can increase the alignment of windings.

The present invention resides in a magnetic core in which a plurality of core pieces have their ends connected to each other to form the shape of a ring. The core pieces have magnetic pole teeth projecting nearly perpendicular to the direction of connecting, a connecting portion is formed on one of the ends, a first end surface of the one of the ends is formed in the shape of a circular arc centered on the connecting portion, and the other end is formed with a second end surface which can mate with the first end surface of an adjoining core piece. A first core member having the cores arranged in the shape of a strip through the end surfaces and a second core member having the cores arranged in the shape of a strip in the opposite direction from the direction of connection of the first core member are stacked such that the ends of adjoining core pieces in the stacking direction overlap each other and the connecting portions are connected so as to be able to freely pivot such that it can be formed into the ring shape with the magnetic pole teeth on the interior. A cutout is formed in the corner on the outer side of the core in the second end surface of each core piece.

Therefore, a core can be provided which makes it possible to perform rewinding with a flyer and which can achieve improved alignment of windings.

A cutout may be formed in each corner on the outer side of the core in the first and second end surface of each core piece.

Portions of the core pieces corresponding in the stacking direction to portions in which the cutouts are formed may be cut out in the same projected cross-sectional shape as the cutouts.

A second cutout may be connected between the cut out portions and forms the shape of the bottom of a boat together with the cut out portions.

Cutouts which are disposed at joints of the ring may have a surface which is formed in the same surface as the second cutouts.

A hole may be formed in the stacking direction in a prescribed location in each core piece.

BRIEF DESCRIPTION OF THE DRAWINGS

The present invention will become more readily apparent from the following detailed description of the preferred embodiments of the present invention taken in conjunction with the accompanying drawings, in which:

FIG. 8 shows a portion of the structure of a core according to a fourth embodiment of this invention, wherein

DETAILED DESCRIPTION OF THE PREFERRED EMBODIMENTS

Below, embodiments of this invention will be described based on the drawings.
Embodiment 1

Figure 1:
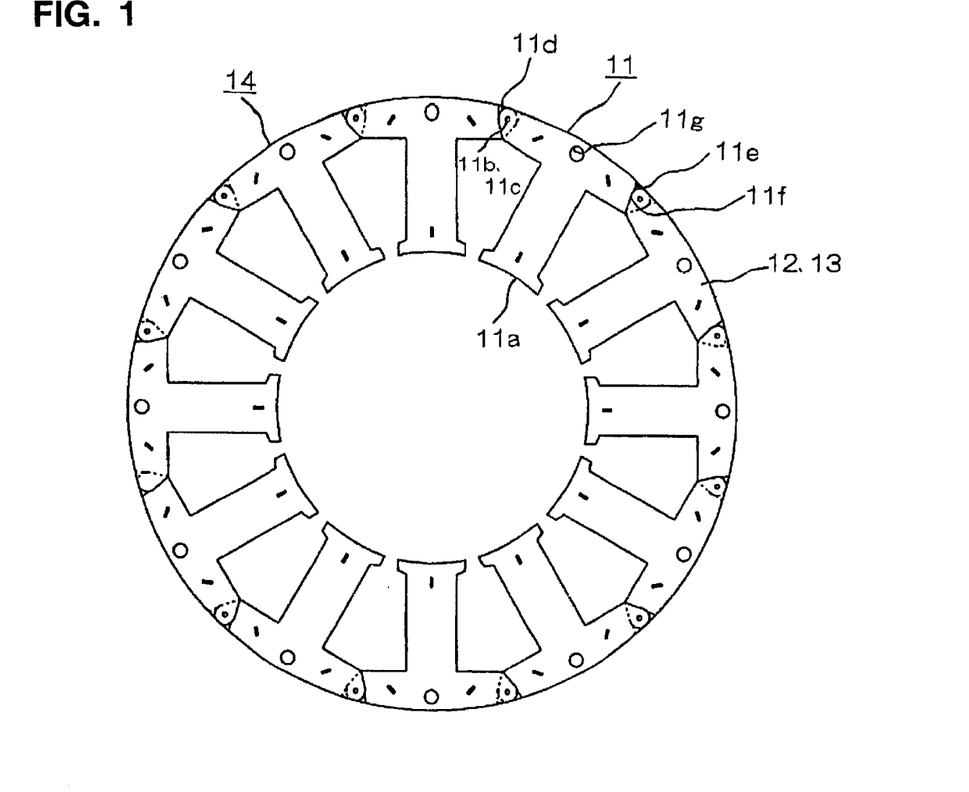
FIG. 1 is a plan view showing the structure of a core according to a first embodiment of this invention.
Figure 2:
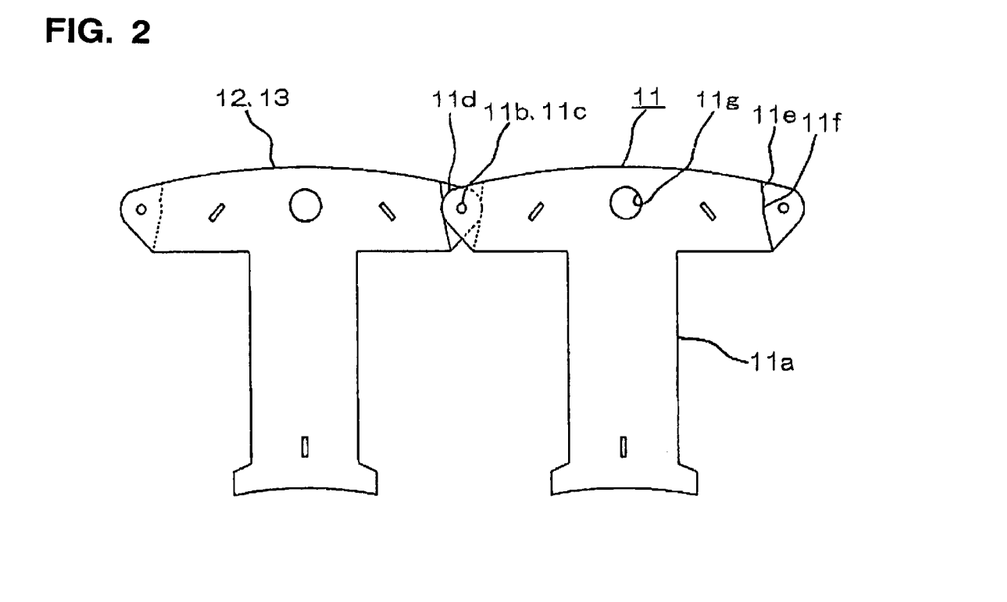
FIG. 2 is a plan view showing a portion of the structure of the core member of FIG. 1 arranged in a straight line.
Figure 3:
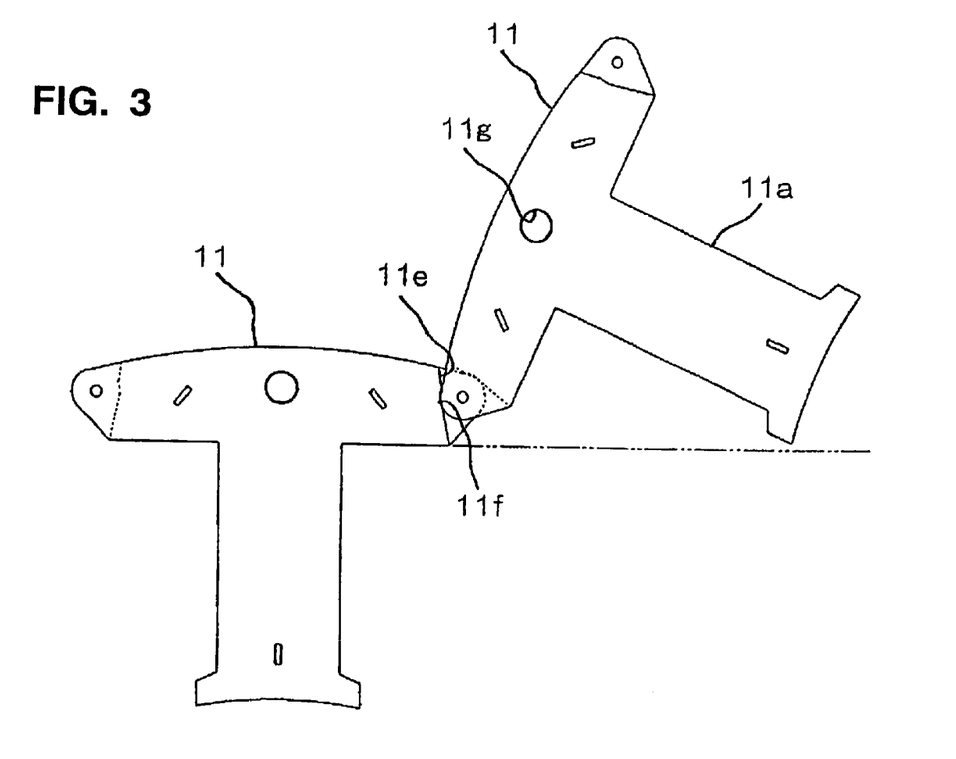
FIG. 3 is a plan view showing a state in which core pieces of the core member of FIG. 2 are pivoted backwards.
Figure 4:
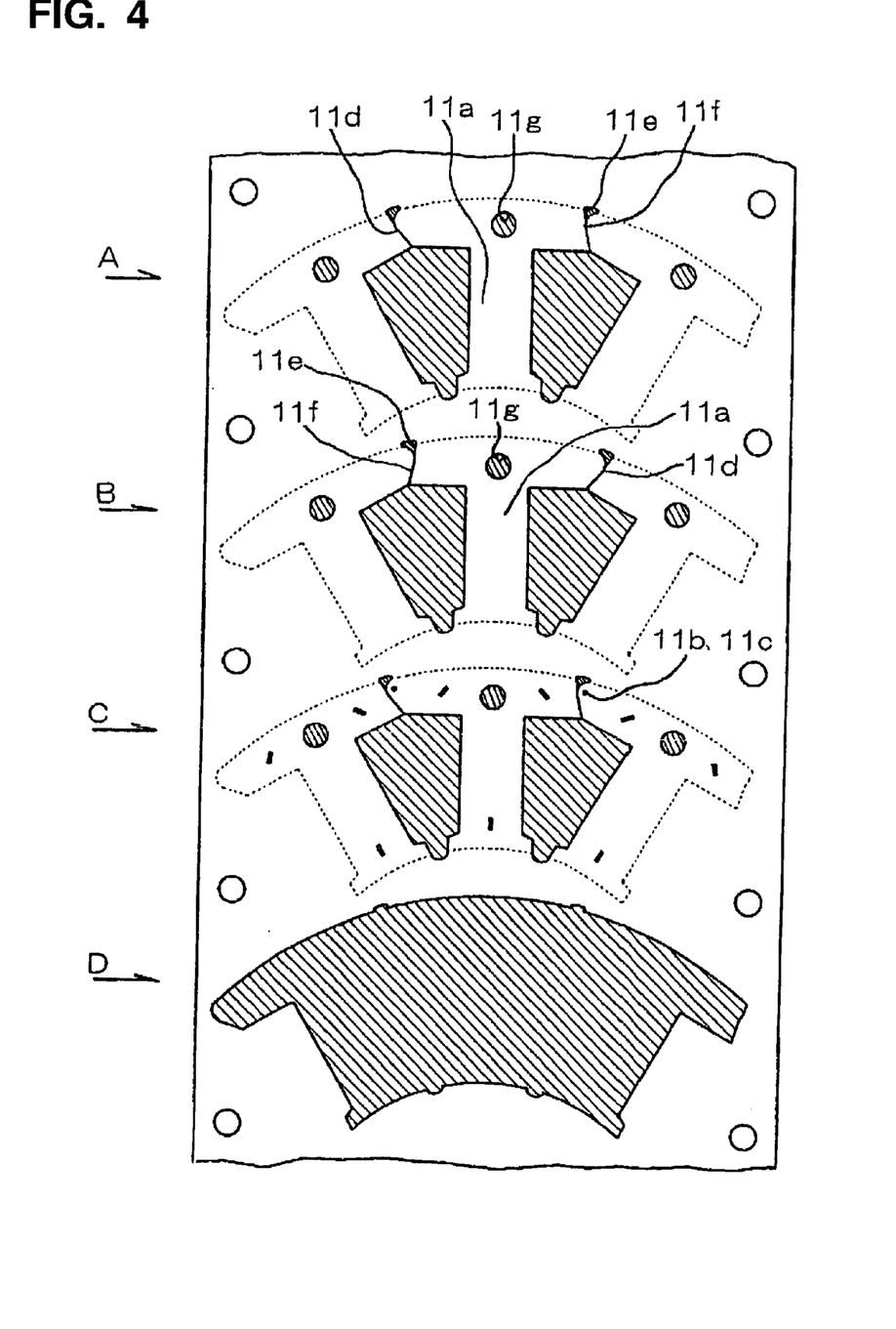
FIG. 4 is a plan view showing steps in forming the core member of FIG. 1 by punching with a press.

FIG. 1 is a plan view showing the structure of a core according to a first embodiment of this invention, FIG. 2 is a plan view showing a portion of the core members of FIG. 1 arranged in a straight line, FIG. 3 shows a state in which the core pieces of the core members of FIG. 2 are rotated backwards, and FIG. 4 is a plan view showing stages in the formation of a core member by punching with a press.

In the figures, 11 is a plate-shaped core piece made of a magnetic material. A magnetic pole tooth 11a projects from one side thereof, and connecting means in the form of a recess 11b and a projection 11c are formed on the rear and front surfaces of one end. A first end surface 11d is formed in the shape of a circular arc centered on the recess and projection 11b and 11c. At the other end is formed a second end surface 11f which can mate with the first end surface 11d of the adjoining core piece 11 and which has a cutout 11e in the corner portion on the side remote from the magnetic pole tooth 11a. A hole 11g is formed at the center of the core piece 11. 12 is a first core member in which a plurality of core pieces 11 formed in this manner are connected into a strip through the end surfaces 11d and 11f.

13 is a second core member in which each core piece 11 is arranged oppositely in the lengthwise direction from in the first core member 12. It is alternatingly stacked with the first core member 12, and the recesses and projections 11b and 11c of the adjoining core pieces 11 in the stacking direction mate with each other whereby they can rotate with respect to each other. 14 is a core which is formed into a ring by rotating the recesses and projections 11b and 11c of each core piece 11 of the first and second core members 12 and 13 which are stacked on each other. The end portions of opposing core pieces 11 overlap each other through the recesses and projections 11b and 11c.

Next, a manufacturing method of a core 14 according to the first embodiment constituted as described above will be described. In the following explanation, there are three magnetic pole teeth 21a.

First, at the position shown by arrow A in FIG. 4, as a first step in forming the first core member 12, by punching out with a press the portions shown by hatching in the drawing in a previous step, by cutting and bending the portions shown by solid lines in the figure in the periphery of the magnetic pole teeth 11a and the portions where the cutout 11e and the hole 11g are formed, the first end surface 11d and the second end surface 11f are formed.

At the position shown by arrow B, as a first step of forming the second core member 13, in the same manner as the above-described first core member 12, by punching out with a press the portions shown by hatching in the figure in a previous unillustrated step, by cutting and bending the portions shown by solid lines in the periphery of the magnetic pole teeth 11a and the portions where the cutout lie and the hole 11g are formed, the first end surface 11d and the second end surface 11f are formed.

Then, at the position shown by arrow C in FIG. 4, on the rear and front surfaces of the end on the side on which the first end surface 11d of core 11 is formed at the position shown by arrow A, a recess and projection 11b and 11c which can mate with each other are formed by punching out with a press. Then, although not shown in the drawings, in a similar manner, at the position shown by arrow B, on the rear and front surfaces of the end portion of the side on which the first end surface 11d of the core piece 11 is formed, a recess and projection 11b and 11c which can mate with each other are formed by punching out with a press.

Next, in the position shown by arrow D in FIG. 4, the portions which are worked at the positions shown by arrows A and C and the portions worked at the positions shown by arrows B and C are successively and alternatingly punched out with a press at the portions shown by hatching in the figure to form a first and a second core member 12 and 13. The core members 12 and 13 are successively stacked in a mold, the recess 11b and the projection 11c which oppose each other in the stacking direction of each core piece 11 are mated with each other, and after caulking is performed to combine them with each other, by rotating the mating recesses and projections 11b and 11c to the reverse pivoted state shown in FIG. 3, winding (not shown) is carried out on each core piece 11 of both core members 12 and 13, and then they are formed into the shape of a ring to complete the core 14.

In this manner, according to the first embodiment, a cutout 11e is formed in the corner portion of the second end surface 11f of each core 11 on the opposite side from the magnetic pole tooth 11a, so by rotating the recess and projection 11b and 11c, it is possible to perform bending to the state shown in FIG. 3 beyond the linear state shown in FIG. 2, i.e., it is possible to perform reverse pivoting, so winding operation by a flyer becomes easy, and the worry of a variation in tensile force generated at the time of rewinding by a nozzle is eliminated, so the alignment of winding can be improved. In addition, a hole 11g is formed in each core piece 11, so a pin or the like can be inserted in order to maintain the attitude of each core piece 11 during winding, so the ease of assembly is improved.
Embodiment 2

Figure 5:
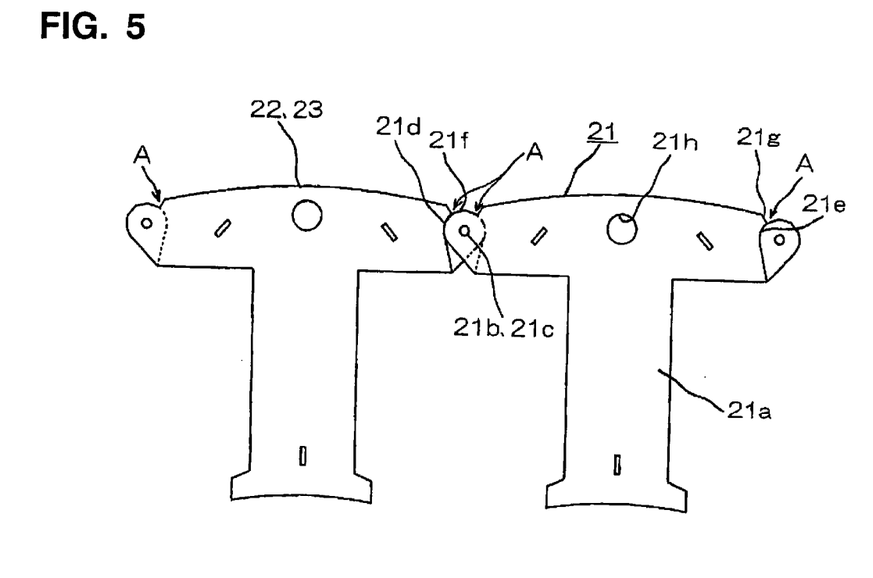
FIG. 5 is a plan view showing a portion of the structure of a core member of a core according to a second embodiment of this invention arranged in a straight line.
Figure 6:
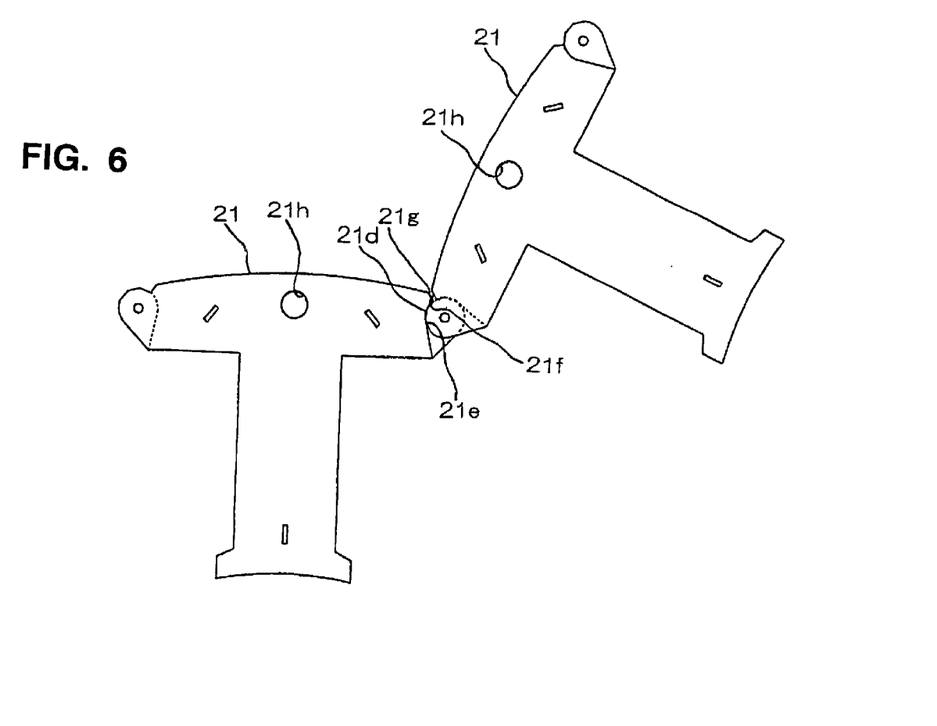
FIG. 6 is a plan view showing a state in which core pieces of the core member of FIG. 5 are pivoted backwards.

FIG. 5 is a plan view showing a portion of the construction of core members of a core according to a second embodiment of this invention in a linear state, and FIG. 6 is a plan view showing the state in which the core pieces of the core member of FIG. 5 are bent backwards.

In the figures, 21 is a plate-shaped core piece made of a magnetic material. A magnetic pole tooth 21a projects from one side, and connecting means in the form of a recess 21d and a projection 21c are formed on the rear and front surfaces at one end. A first end surface 21d is formed in the shape of a circular arc centered on the recess and projection 21b and 21c. The other end is formed with a second end surface 21e which can mate with the first end surface 21d of an adjoining core piece 21.

Cutouts 21f and 21g are formed in the corners of the first and second end surfaces 21d and 21e on the side remote from the magnetic pole tooth 21a. In addition, a hole 21h is formed at the center of each core piece 11.

22 is a first core member which is formed by arranging a plurality of the core pieces 21 which are formed in this manner into the shape of a strip through the end surfaces 21d and 21e. 23 is a second core member in which each of the core pieces 21 is arranged in the opposite lengthwise direction from the first core member 22. It is alternatingly stacked with the first core member 22 and to form a single body, and the recesses and projections 21b and 21c of adjoining core pieces 21 in the stacking direction are mated with each other so as to be able to freely rotate. Each portion corresponding in the stacking direction to each cutout 21f and 21g is also cut out in the same projected shape as the cutouts 21f and 21g (shown by the arrows A in FIG. 5.)

According to the second embodiment, cutouts 21f and 21g are formed in the first and second end surfaces 21d and 21e of each core piece 21 in the corner portion on the side remote from the magnetic pole teeth 21a, and the first end surface 21d of one of the core pieces 21 adjoining each other in the lengthwise direction is made to oppose the second end surface 21e of the other, so as shown in FIG. 6, reverse pivoting of the core pieces 21 becomes easy, so it is of course possible to improve the ease of assembly. In addition, a cutout having the same projected cross-sectional shape as each of cutouts 21f and 21g is formed in the portion of each core piece 21 corresponding in the stacking direction to the portion in which the cutouts 21f and 21g are formed, so reverse pivoting becomes even easier, and by that amount, the depth of the cutouts 21f and 21g can be made shallower, so a decrease in the magnetic path by the provision of the cutout 21f and 21g can be suppressed, and a decrease in magnetic properties can be prevented.

Although not mentioned with respect to the above-described first embodiment, in the first embodiment as well, in the same manner as in the second embodiment, by providing cutouts having the same projected cross-sectional shape as cutout 11 in the portion of each core piece 11 corresponding in the stacking direction to the portion in which the cutout 11e is formed, the same effects as described above can of course be obtained.

Embodiment 3

Figure 7:
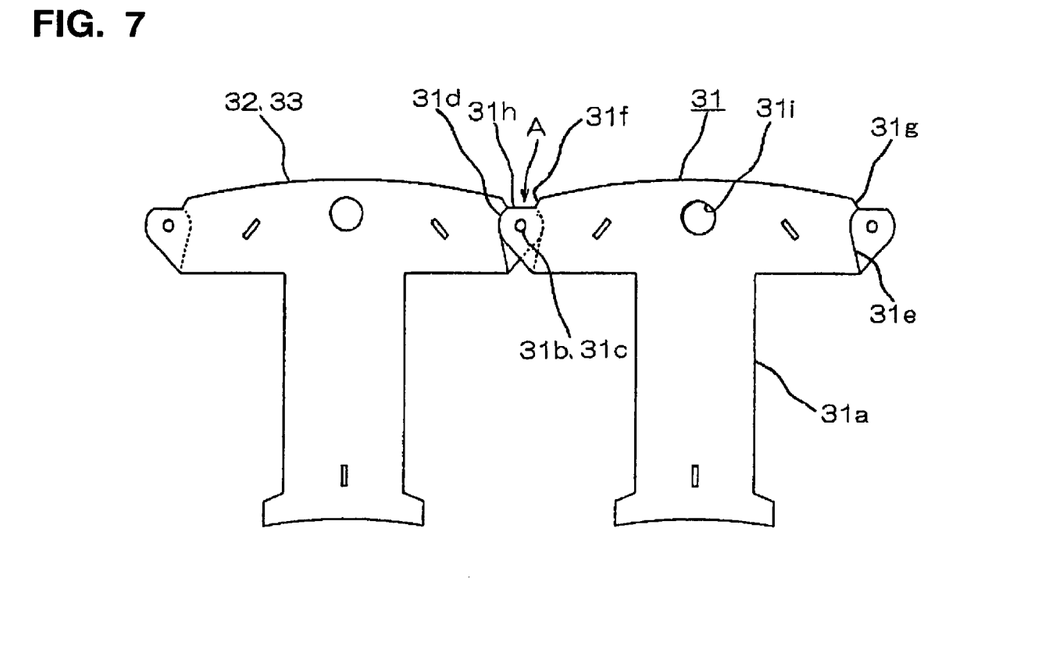
FIG. 7 is a plan view showing a portion of the structure of a core member of a core according to a third embodiment of this invention arranged in a straight line.

FIG. 7 is a plan view showing core members of a core according to a third embodiment of this invention arranged in a straight line.

In the figures, 31 is a plate-shaped core piece made of a magnetic material. A magnetic pole tooth 31 projects from one side thereof. Connecting means in the form of a recess 31b and a projection 31c are formed on the rear and front surfaces of one end. A first end surface 31d thereof is formed in the shape of a circular arc centered on the recess and projection 31b and 31c. At the other end is formed a second end surface 31e which can mate with the first end surface 31d of an adjoining core piece 31.

A cutout 31f and 31g is respectively formed in the corner portion of the first and second end surfaces 31d and 31e on the side remote from the tooth 31a. On the side of the first end surface 31d, between the cutout 31f, a second cutout 31h is formed extending in a direction perpendicular to the magnetic pole tooth 31a. In addition, a hole 31i is formed as the center of the core piece 11.

32 is a first core member formed by arranging a plurality of the core pieces 31 formed as described above into the form of a strip through each of the end surfaces 31d and 31e. 33 is a second core member in which the core pieces 31 are arranged in the opposite lengthwise direction from in the first core member 32. It is alternatingly stacked on the first core member 32 to form a single body. The recesses and projections 31b and 31c of adjoining core pieces 31 in the stacking direction mate with each other so as to freely rotate. The second cutout 31h is connected between both cutouts 31f and 31g in this state, and it has the shape of the bottom of a boat (shown by arrow A in FIG. 7).

In this manner, according to the third embodiment, a second cutout 31h extending in the direction perpendicular to the magnetic pole teeth 31a is formed between the first end surface 31d and the cutout 31f of the core pieces 31, and the second cutout 31h extends in the shape of the bottom of a boat between the cutout 31f of the first end surface 31d of one of two core pieces 31 adjoining in the lengthwise direction and the cutout 31g of the second end surface 31e of the other. Therefore, compared to the case of the cutout 11e of the above-described first embodiment and the cutouts 21f and 21g of the second embodiment, the area of the cutouts can be increased. Therefore, the cross-sectional area of a die for punching out this portion can be made larger, so the strength of the die can be increased and its lifespan can be lengthened.

Embodiment 4

Figure 8A:
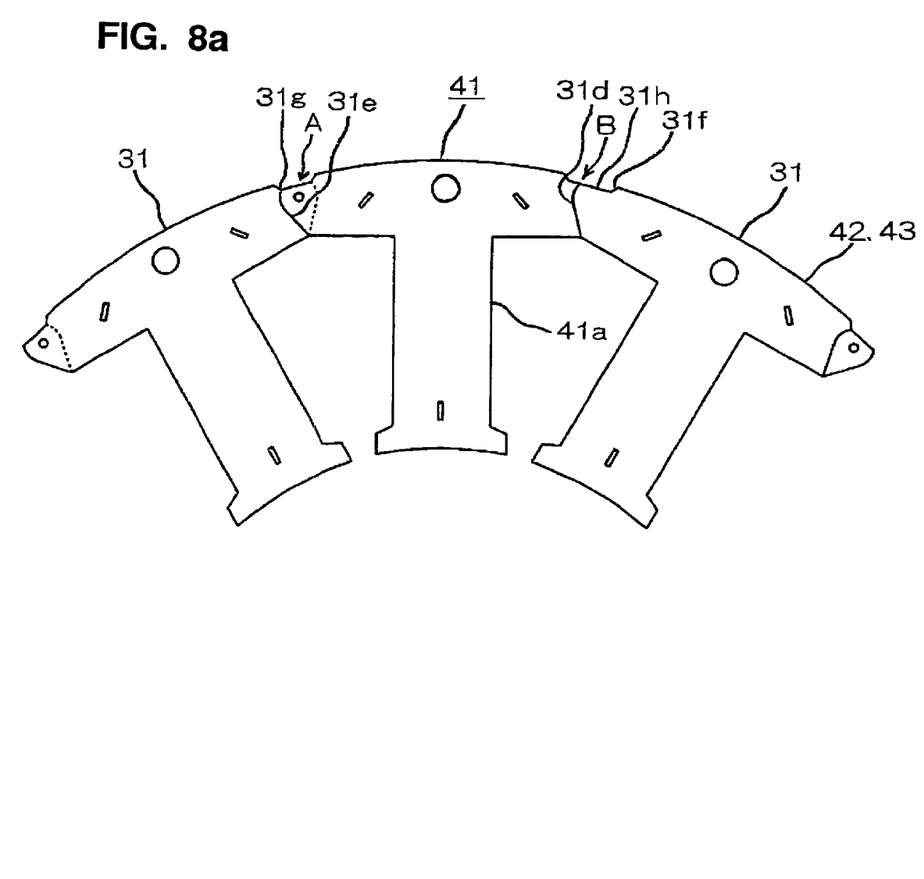
FIG. 8a is a plan view.
Figure 8B:
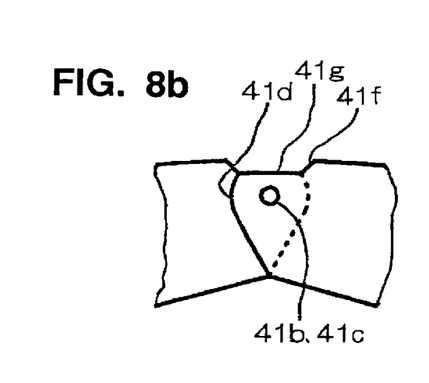
FIG. 8b is a detailed view of a first end surface.
Figure 8C:
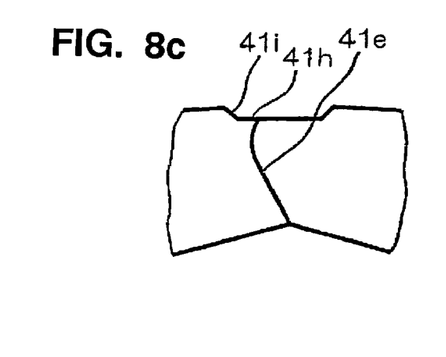
FIG. 8c is a detailed view of a second end surface.

FIG. 8 shows a portion of the structure of a core according to a fourth embodiment of this invention. FIG. 8a is a plan view, FIG. 8b is a detailed view of a first end surface, and FIG. 8c is a detailed view of a second end surface. In the figures, portions which are the same as in the third embodiment are affixed with the same symbols and an explanation thereof will be omitted. 41 is a plate-shaped core piece made of a magnetic material. A magnetic pole tooth 41a projects from one side thereof. Connecting means in the form of a recess 41b and a projection 41c are formed on the rear and front surface of one side. A first end surface 41d thereof is formed in the shape of a circular arc centered on the recess and the projection 41b and 41c. It can mate with the second end surface 31e of an adjoining core piece 31. A second end surface 41e which can mate with the first end surface 31d of an adjoining core piece 31 is formed on the other end.

In the corner of the first end surface 41d on the side remote from the magnetic pole tooth 41a, a cutout 41f and a second cutout 41g are formed in the same manner as the cutout 31f and the second cutout 31h of core piece 31. In the corner portion of the second end surface 41e on the side remote from the magnetic pole tooth 41a is formed a cutout 41i like the cutout 31g of core piece 31 through the surface 41h which is formed in the same surface as the second cutout 31h in the adjoining core 31. 42 is a first core member formed by arranging a plurality of the core pieces 31 at the joints of core pieces 41 formed as described above in the form of a strip through the end surfaces 31d, 31e, 41d, and 41e.

43 is a second core member in which the core pieces 31 and 41 are arranged in the opposite lengthwise direction from the first core member 42. It is alternatingly stacked with the first core member 42 to form a single body. The recesses and projections 31b and 31c of adjoining core pieces 31 in the stacking direction and the recesses and projections 31b, 41b, 31c, and 41c of core piece 31 and core piece 41 mate so as to be able to freely rotate. The portions corresponding to the cutouts 31g, 41g, and 41f in the stacking direction are cut out with the same projected cross-sectional shape as the cutouts 31g, 41g, and 41f, (shown by A in FIG. 8a), and the portions corresponding in the stacking direction to cutouts 41i, 31h, and 31f are cut out with the same projected cross-sectional shape as cutouts 41i, 31h, and 31f (shown by B in FIG. 8a).

In this manner, according to the fourth embodiment, compared to the case in which a cutout 41i is directly formed in the corner of the second end surface 41e, it becomes easier to guarantee work space when securing the joints by welding or the like, so the ease of assembly is improved.

As described above, a core is one in which a plurality of core pieces have their ends connected to each other to form the shape of a ring, the core pieces have magnetic pole teeth projecting nearly perpendicular to the direction of connecting, a connecting portion is formed on one of the ends, a first end surface of the one of the ends is formed in the shape of a circular arc centered on the connecting portion, and the other end is formed with a second end surface which can mate with the first end surface of an adjoining core piece, and a first core member having the cores arranged in the shape of a strip through the end surfaces and a second core member having the cores arranged in the shape of a strip in the opposite direction from the direction of connection of the first core member are stacked such that the ends of adjoining core pieces in the stacking direction overlap each other and the connecting portions are connected so as to be able to freely pivot such that it can be formed into the ring shape with the magnetic pole teeth on the interior, wherein a cutout is formed in the corner on the outer side of the core in the second end surface of each core piece. Therefore, a core can be provided which makes it possible to perform rewinding with a flyer and which can achieve improved alignment of windings.

According to according to this invention, a core is one in which a plurality of core pieces have their ends connected to each other to form the shape of a ring, the core pieces have magnetic pole teeth projecting nearly perpendicular to the direction of connecting, a connecting portion is formed on one of the ends, a first end surface of the one of the ends is formed in the shape of a circular arc centered on the connecting portion, and the other end is formed with a second end surface which can mate with the first end surface of an adjoining core piece, and a first core member having the cores arranged in the shape of a strip through both end surfaces and a second core member which is arranged in the shape of a strip in the opposite direction from the direction of connection of the first core member are stacked such that the ends of adjoining core pieces in the stacking direction overlap each other and the connecting portions are connected so as to be able to freely pivot such that it can be formed into the ring shape with the magnetic pole teeth on the interior, wherein a cutout is formed in each corner on the outer side of the core in the first and second end surface of each core piece. Therefore, a core can be provided which makes it possible to perform rewinding with a flyer and which can achieve improved alignment of windings.

Portions of the core pieces corresponding in the stacking direction to portions in which the cutouts are formed are cut out in the same projected cross-sectional shape as the cutouts. Therefore, a core can be provided which makes it possible to prevent a decrease in magnetic properties.

A a second cutout is connected between the cut out portions and forms the shape of the bottom of a boat together with the cut out portions. Therefore, a core can be provided which can achieve an increased lifespan of a die.

Cutouts which are disposed at joints of the ring have a surface which is formed in the same surface as the second cutouts. Therefore, a core can be provided which can achieve increased ease of assembly.

A hole is formed in the stacking direction in a prescribed location in each core piece. Therefore, a core can be provided which can achieve increased ease of assembly.

What is claimed is:

1. A core in which a plurality of core pieces have their ends connected to each other to form the shape of a ring, the core pieces have magnetic pole teeth projecting nearly perpendicular to the direction of connecting, a connecting portion is formed on one of the ends, a first end surface of the one of the ends is formed in the shape of a circular arc centered on the connecting portion, and the other end is formed with a second end surface which can mate with the first end surface of an adjoining core piece, and a first core member having the cores arranged in the shape of a strip through the end surfaces and a second core member having the cores arranged in the shape of a strip in the opposite direction from the direction of connection of the first core member are stacked such that the ends of adjoining core pieces in the stacking direction overlap each other and the connecting portions are connected so as to be able to freely pivot such that it can be formed into the ring shape with the magnetic pole teeth on the interior, characterized in that a cutout is formed in the corner on the outer side of the core in the second end surface of each core piece.

2. A core as claimed in claim 1, characterized in that portions of the core pieces corresponding in the stacking direction to portions in which the cutouts are formed are cut out in the same projected cross-sectional shape as the cutouts.

3. A core as claimed in claim 1 characterized in that a hole is formed in the stacking direction in a prescribed location in each core piece.

* * * * *